Figure 1:
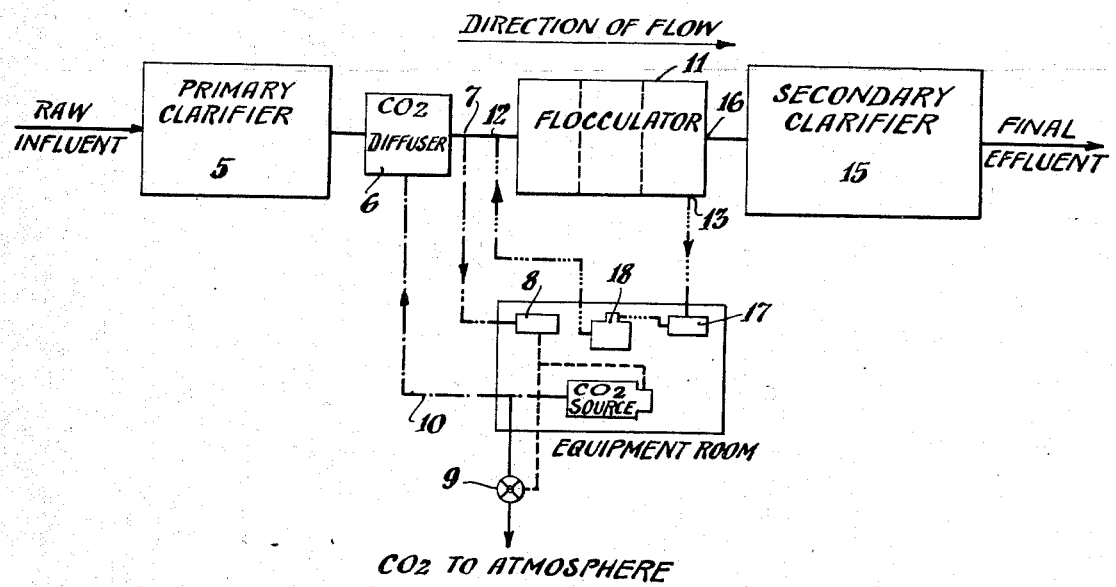

May 30, 1944.  J. W. HOOD  2,350,111

CLARIFICATION OF LIQUIDS

Filed Aug. 3, 1940

INVENTOR.

John W. Hood

BY

Edwards, Bower & Pool

ATTORNEYS

Patented May 30, 1944

2,350,111

UNITED STATES PATENT OFFICE 2,350,111

CLARIFICATION OF LIQUIDS

John W. Hood, Ridgewood, N. J., assignor to Acco, Incorporated, Bloomfield, N. J., a corporation of New Jersey Application August 3, 1940, Serial No. 351,214

5 Claims. (Cl. 210—23)

This invention relates to the clarification of water, sewage and various waste liquors by chemical coagulation and sedimentation, and particularly coagulation by a chemical electrolyte such as aluminum sulphate or an iron salt, ferric sulphate, ferrous sulphate or ferric chloride.

The object is to bring the water or sewage into condition to make most efficient use of the chemical coagulant and attain coagulation giving an effluent liquid of uniform near zero turbidity in the following tank or clarifier.

The procedure comprises the introduction of carbon dioxide, $CO_2$, by means of a blower or compressor, to "raw" sewage or untreated water or other liquor prior to chemical treatment for clarification, for the purpose of precarbonating the untreated liquid and so adjusting the chemical balance of the sewage or water structure, that substantial economy will be effected in the amount of chemical (electrolyte) normally consumed to produce the same degree of clarification previously accomplished with much larger amounts of chemical. This also reduces the problem of residual alumina in the effluent and works an economy in the hydrated lime used to control the alkalinity in the digester.

I have found that for chemical precipitation of sewage and the like a definite minimum requirement of electrolyte exists in any sewage or water. This is apparently due to surface adsorption of the dissolved organic and colloidal matter. When this demand has been satisfied, coagulation is successful, precipitation from solution of the dissolved matter being complete, resulting in the clarification of the sewage.

However, it has been noted that an unfavorable chemical balance daily and seasonally intervenes in most plants to prevent proper precipitation at this juncture, and modification of the balance to a favorable zone invariably involves large increase in the amount of chemical serving as the electrolyte. This is a costly proceeding in terms of chemical consumed.

A substitute for the additional chemical being used for chemical balance adjustment has been sought, but it was discovered that. strong acids were not always dependable and had a bactericidal effect on the biological entities by which the anaerobic digestion of sewage sludge is promoted and the conversion of complex volatile organic matter to stable chemical elements accomplished.

Laboratory determinations and plant observations have shown that carbon dioxide and the resulting carbonic acid

are not detrimental to the organic and bacterial life involved in the digestion process.

In the accompanying drawing illustrating the invention

Figure 2:
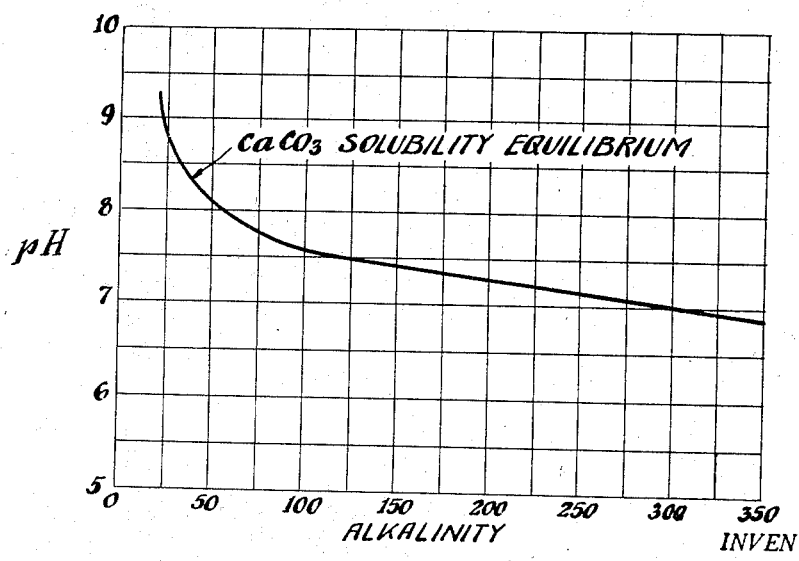

Fig. 1 is a diagram showing a typical layout for the liquid clarification of this invention, and Fig. 2 is a reproduction of the calcium carbonate solubility equilibrium curve.

In the system of this invention the liquid to be coagulated is passed into a primary clarifier 5 unless already sufficiently clarified. When clarified it has carbon dioxide diffused and distributed in diffuser 6 in it so as to come thoroughly into contact with all parts of the liquid and the supply of carbon dioxide is such as to reduce the pH to about 5.9 to 6.1. To attain this a small portion of the treated liquid is drawn off from a point 7 subsequent to the carbon dioxide diffuser 6 and passed through a pH meter 8 connected at 9 to control the supply 10 of carbon dioxide automatically to maintain the pH within the desired limits. It is important that this pH control be substantially continuous, the control meter 8 receiving a constant supply from the treated liquid and exercising a constant control over the supply of the carbon dioxide to the diffuser. In practice the pH meter used may be a Coleman or Cambridge or other standard pH meter connected to a valve in the carbon dioxide supply so as to accurately vary the supply instantaneously at all times. The Coleman meter referred to is that of the Coleman Electric Co., Inc. of Maywood, Illinois, and the Cambridge meter is that of the Cambridge Instrument Co., Inc., Grand Central Terminal, New York, N. Y. In some instances it may be more economical to vary the amount of combustion producing the carbon dioxide. The diffuser may be of any desired efficient type such as the porous stone-type manufactured by the Norton company and the Carborundum company.

The carbon dioxide treated liquid from the diffuser with a pH of about 6.0 then has introduced into it and mixed with it at 12 an accurately measured amount of chemical electrolyte such as aluminum sulphate or a mixture of iron salts or the like, the quantity of the chemical being controlled in accordance with the turbidity of the liquid at a point 13 immediately after segregation. To accomplish this segregation the chemically treated liquid is run into a "flocculator" 14 preferably of the mechanical type, after which the liquid may be run off to a secondary clarifier 15 at a point 16 in the "flocculator" closely following the attainment of segregation, and part of the liquid is continuously drawn off at 13 and clarified by sedimentation and passed to a turbidimeter 17 measuring the turbidity by directing light into a passing current of the liquid and measuring the resulting illumination in a line at right angles to the original beam and correspondingly and continuously controlling the supply of the coagulating chemical. The turbidimeter 17 is set to give a supply of chemical from chemical feeder 18 according to the desired clarity of the effluent from the "flocculator," for instance, depending upon whether this effluent is to be clear or crystal clear. In practice the controlling instrument 17 may be a No. 11 turbidity meter of the Coleman Electric Company of Maywood, Illinois.

The effect of the addition of the aluminum sulphate or other similar chemical electrolyte is to reduce the alkalinity and at the same time to some degree also lower the pH, and I have found that in order to obtain a clear effluent from the "flocculator," it is necessary to arrive at a point plotted to pH as ordinates and alkalinity as abscissae which will be below the calcium carbonate solubility equilibrium curve as determined by Charles R. Cox in his pamphlet "Water supply control," Bulletin 22, 1939, of the New York State Department of Health, pages 139–147. For a clear effluent, this point should be 1.0 pH or more below this calcium carbonate solubility equilibrium curve and 1.25 pH or more below for crystal clarity.

It is possible at all times to check the operation of the pH and turbidity controls by the final pH and alkalinity of the effluent so as to always determine just where this effluent is with relation to the calcium carbonate equilibrium curve. Anything too near to this equilibrium curve is bound to be relatively cloudy and less satisfactory and the cloudiness increases in objectionable manner as the curve is approached.

It somewhat frequently occurs that the raw liquid is beyond the range of efficient control by the carbon dioxide and chemical electrolyte. While the carbon dioxide may be used to reduce the pH to within the desired range, the alkalinity at this point may be still so high as to preclude the successful treatment with the chemical electrolyte because of the excessive quantities called for and the resulting complications caused by such excess. In such case I have found it possible to bring the raw liquid within efficient treatment by diluting it with a source of water having a sufficiently lower pH alkalinity. To accomplish this it is only necessary to add such a quantity of the water as will enable the carbon dioxide and chemical treatment to bring the final condition of the effluent the desired amount below the Cox calcium carbonate solubility equilibrium curve as above explained. The dilution water may, for instance, be drawn off from the clarified effluent of the secondary clarifier or from such other part of the purification system as is most efficient and practical as a source of dilution.

In addition to the saving in chemicals the process in using the volatile carbon dioxide to depress the pH avoids imparting a permanent acidity to the liquid and thus dispenses with the necessity of later correcting this acidity where higher pH values are subsequently required. For instance, where the raw solids from the secondary clarifier are passed on to a digester, this coagulum bearing organic matter should not be at all strongly acid and it is often necessary to use lime to correct the acidity particularly where sulphuric or other acids have been used in the earlier treatments. The acidity provided by the volatile carbon dioxide being temporary disappears prior to digestion and reduces or avoids altogether the use of lime as a corrective. This is also true in water purification where any permanent acidity after coagulation is undesirable.

With the continuous controls of the present process there is very close uniformity in results, the clarified effluent from the secondary clarifier being very even in composition in spite of wide variations in the raw influent and all this is accomplished under conditions insuring effective regulation of the entire procedure and with a minimum of inspection and intervention by the operator.

The calcium carbonate solubility equilibrium curve referred to in the foregoing specification and the following claims is that shown in Fig. 2 of the accompanying drawing.

I claim:

1. A coagulation process comprising diffusing carbon dioxide in thorough contact with a supply of raw aqueous liquid containing coagulable matter and having a pH value not less than the pH value at which calcium carbonate can exist in equilibrium in said liquid, continuing said treatment with sufficient carbon dioxide to lower the pH value of the liquid to a point below said pH value at which calcium carbonate can exist in equilibrium in said liquid, terminating said carbon dioxide treatment and then adding a coagulant acting further to lower the pH value of said liquid so that it is 1.0 or more below said pH value at which calcium carbonate can exist in equilibrium in said liquid and effective to cause coagulation of matter in said liquid to clarify the liquid to desired degree.

2. The process as set forth in claim 1 in which the supplies of the liquid, the carbon dioxide and the coagulant are continuous, the carbon dioxide is diffused in the liquid in advance of the addition of the coagulant and in amount reducing the pH to about 6.0 pH.

3. The process as set forth in claim 1 in which the supplies of the liquid, the carbon dioxide and the coagulant are continuous with continuous control of the amount of carbon dioxide and a continuous control of the amount of added coagulant.

4. The process as set forth in claim 1 in which the coagulant is aluminum sulphate.

5. A coagulation process comprising mixing a raw aqueous liquid containing coagulable material with an inflow of water of lower pH so as to lower the resultant pH of the mixture, further treating the mixture of liquids with sufficient carbon dioxide to lower the pH value of the liquid to a point below said pH value at which calcium carbonate can exist in equilibrium in said liquid, terminating said carbon dioxide treatment and then adding a coagulant acting further to lower the pH value of the liquid so that it is 1.0 or more below said pH value at which calcium carbonate can exist in equilibrium in said liquid and effective to cause coagulation of material in said liquid to clarify the liquid to desired degree.

JOHN W. HOOD.